UNITED STATES PATENT OFFICE.

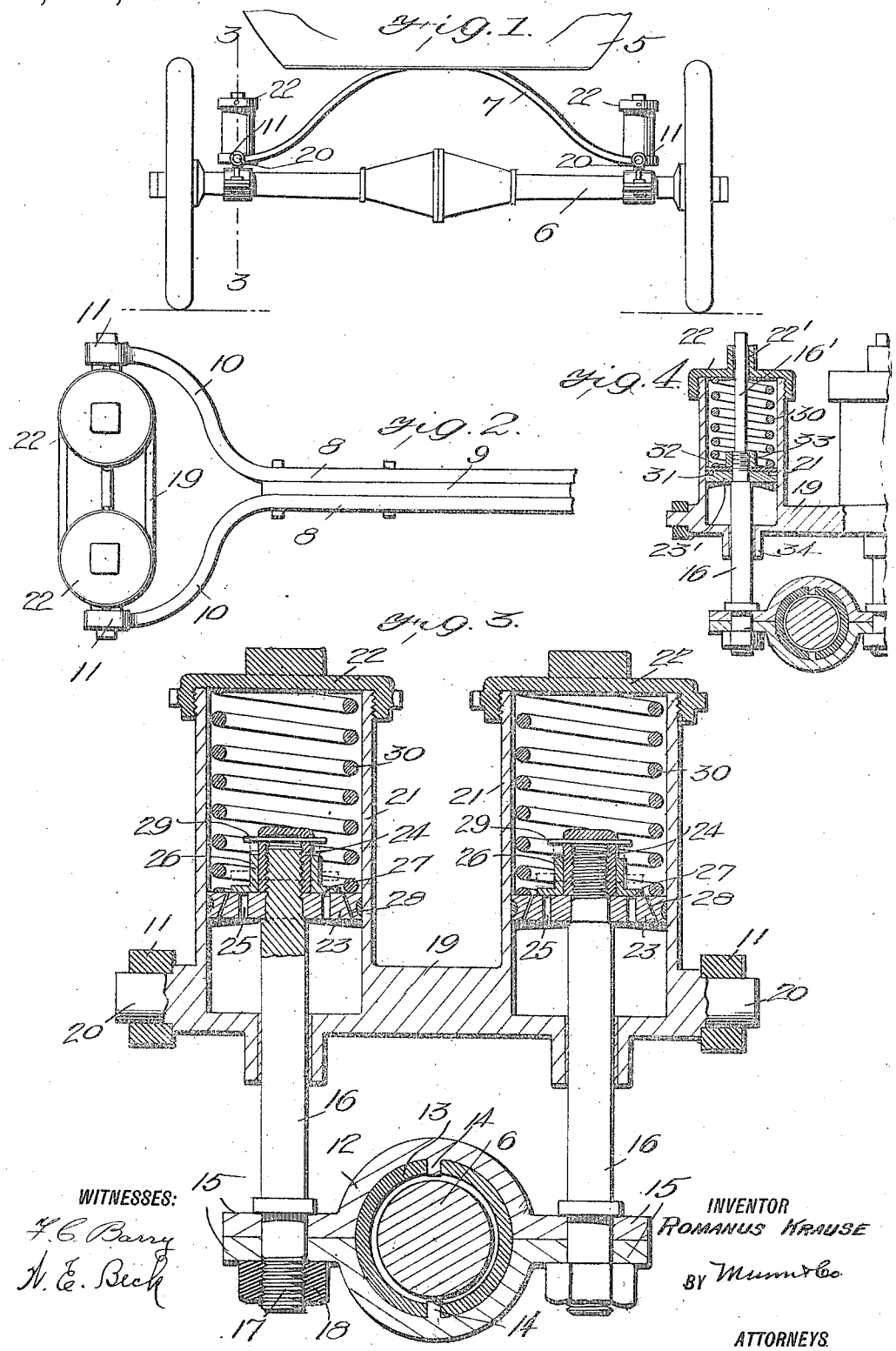

ROMANUS KRAUSE, OF BELHAVEN, NORTH CAROLINA, ASSIGNOR TO JOHN G. TOOLY, OF BELHAVEN, NORTH CAROLINA.

AIR-CUSHION FOR AUTOMOBILES.

1,208,578.  Specification of Letters Patent.  Patented Dec. 12, 1916.

Application filed October 1, 1915.  Serial No. 53,486.

*To all whom it may concern:*

Be it known that I, ROMANUS KRAUSE, a citizen of the United States, and a resident of Belhaven, in the county of Beaufort and State of North Carolina, have invented an Improvement in Air-Cushions for Automobiles, of which the following is a specification.

This invention is an improvement in vehicles and has particular reference to cushioning devices for the chassis designed to replace the usual springs and shock absorbers.

An object of the invention is to provide supports rigidly secured to the chassis and connected to a plurality of cushioning devices certain parts of which are fixed and others movable relative to the axles.

Another object of the invention is the provision of a plurality of cushioning devices each of which consists of stationary pistons secured to an axle of the vehicle and coöperating with a movable cylinder in which is mounted a spring which, together with the air in the cylinder, receives the pressure of the downward movement of the chassis and which is also utilized to return the cylinder to normal position.

The inventive idea involved is capable of receiving a variety of mechanical expressions, some of which, for the purpose of illustrating the invention, are shown in the accompanying drawing, in which—

Figure 1 is a fragmentary elevation of a vehicle showing the invention applied thereto. Fig. 2 is a fragmentary top plan view of part of the invention. Fig. 3 is a section on the line 3—3 of Fig. 1. Fig. 4 is a view similar to Fig. 3 showing a slightly modified form of the invention.

Referring more particularly to the accompanying drawing, the numeral 5 indicates conventionally the chassis of an automobile and 6 one of the axles therefor. The front and rear axles are both preferably provided with the device embodying the invention and a description of one will, therefore, suffice.

The rigid supporting bar generally indicated by 7 is bowed, as shown in Fig. 1, and secured intermediate its ends to the chassis 5 whereby the latter is supported. This bar preferably comprises side members 8 between which is mounted a filler 9, each of the side members having outwardly curved ends 10 the extremities of which are provided with bearings 11 for a purpose which will presently appear. Each end of the arm 7 has associated therewith one of the cushioning devices comprising one of the essential features of the invention and for the purpose of mounting these devices there is provided a split bearing sleeve 12 which surrounds the casing 13 of the axle 6 and which is provided with the dowel-pins 14 engaging suitable openings formed in said casing whereby the entire cushioning device is prevented from becoming displaced relative to the axle. The oppositely disposed abutting flanges 15 of the sleeve 12 have mounted therein the vertically arranged piston rods 16, the lower ends of which are threaded at 17 to receive nuts 18 thereon for securely retaining said rods in position.

Each of the cushioning devices further includes a vertically movable element 19 the ends 20 of which are mounted in the bearings 11 of the rigid supports 7. Oppositely disposed cylinders 21 are preferably formed integrally with the element 19 and are adapted to receive therein the piston rods 16. In the embodiment shown in Fig. 3, the top of the cylinders 21 are provided with closures 22 detachably mounted thereon. The upper end of each piston rod 16 has mounted thereon the piston 23 which is secured in position by means of a capped nut 24, said piston being provided transversely therethrough with a plurality of large ports 25 adapted to be closed by means of a valve 26 which includes an annular sleeve surrounding the nut 24 and having a flange 27 at one end which rests upon the top of said piston. The latter is also provided with a plurality of smaller ports 28 which permits of a free passage of air in the cylinder from one side of the piston to the other. In order to limit the movement of the valve 26 so that the same will not become dismounted from the nut 24 the latter is provided with a pin 29 extending transversely therethrough and adjacent its top whereby the valve 26 will contact therewith, as shown in dotted lines, when the cylinder moves upwardly. Interposed between the closure 22 and piston 23 is a large coil spring 30 of great strength which is adapted to receive the pressure from the piston 23 when the cylinder moves downwardly, the ports 25 being closed by the valve 26 in order that the air may be retained in the top of the cylinder except that which passes through the small openings 28.

It will thus be seen that the pistons are relatively stationary and that the cylinders have vertical movement. Therefore, when a wheel of the vehicle strikes an obstruction, the tension of the springs will thrust the body of the car upwardly, which consequently results in the cylinders also moving upwardly against the tension of the spring 30. Should a wheel sink into a hole or depression, the tension of the said spring relaxes and, owing to the fact that said tension is quicker than the downward movement of the body of the car, the valve 26 opens and permits air pressure to pass into the upper portion of the cylinder. Then when said body drops, the downward movement is cushioned by the air above the piston.

In the embodiment shown in Fig. 4 each of the piston rods 16 is provided with an extension 16′ which projects through a bearing 22′ in the closure 22 for the cylinder. The utilization of a valve and ports in this embodiment is dispensed with and the piston 23′ is made solid and provided with a packing ring 31 retained in position by a plate 32 interposed between a nut 33 and said piston. The bearing 22′ in the closure 22 and bearing 34 formed integrally with the element 19 at the lower end of the cylinder are not packed so that sufficient atmospheric pressure will leak therethrough into the cylinder. The actual operation of these devices is the same as that previously described with the exception that the cylinders are returned to their normal positions more slowly since this return movement is due only to the action of the springs 30.

What is claimed is:

In a vehicle, the combination with a chassis and an axle, of a cushioning device associated with the end of said axle and including a sectional flanged sleeve surrounding the same and fixed relative thereto, vertically arranged piston rods extending through and supported by the flanges of said sleeve, pistons carried by said rods and having large and small ports therein, a vertically movable element having cylinders formed integrally therewith and adapted to receive said pistons, a spring interposed between each of said pistons and the upper end of the cylinder in which the piston is mounted, a valve for controlling the passage of air through the large port in said piston, and a support secured intermediate its ends to said chassis and connected at its ends to said vertically movable element.

ROMANUS KRAUSE.

Witnesses:
M. B. MAXINER,
J. O. McKINNEY.

Copies of this patent may be obtained for five cents each, by addressing the "Commissioner of Patents, Washington, D. C."